(12) United States Patent
Fujii et al.

(10) Patent No.: US 10,606,571 B2
(45) Date of Patent: Mar. 31, 2020

(54) DEPENDENCE RELATIONSHIP EXTRACTION APPARATUS AND COMPUTER READABLE MEDIUM

(71) Applicant: MITSUBISHI ELECTRIC CORPORATION, Chiyoda-ku, Tokyo (JP)

(72) Inventors: Natsuko Fujii, Tokyo (JP); Yuki Hikawa, Tokyo (JP); Ryo Kashiwagi, Tokyo (JP); Katsuhiko Nakamura, Tokyo (JP); Takanari Fujimoto, Tokyo (JP); Miwa Fukuda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/084,272

(22) PCT Filed: Apr. 26, 2016

(86) PCT No.: PCT/JP2016/063112
§ 371 (c)(1),
(2) Date: Sep. 12, 2018

(87) PCT Pub. No.: WO2017/187537
PCT Pub. Date: Nov. 2, 2017

(65) Prior Publication Data
US 2019/0079742 A1    Mar. 14, 2019

(51) Int. Cl.
*G06F 11/36*    (2006.01)
*G06F 17/30*    (2006.01)
(Continued)

(52) U.S. Cl.
CPC ............... *G06F 8/433* (2013.01); *G06F 8/75* (2013.01); *G06F 9/44505* (2013.01);
(Continued)

(58) Field of Classification Search
CPC .......... G06F 8/75; G06F 8/10; G06F 11/3672; G06F 11/3624; G06F 16/2282;
(Continued)

(56) References Cited

U.S. PATENT DOCUMENTS 5,933,820 A * 8/1999 Beier ............... G06F 16/2282
6,233,729 B1 * 5/2001 Campara ............... G06F 8/75
717/131
(Continued)

FOREIGN PATENT DOCUMENTS

JP    2007109073 A    4/2007
JP    2012230538 A    11/2012
(Continued)

OTHER PUBLICATIONS

Alejandro Serrano et al., Type families with class, type classes with family, Sep. 3-4, 2015, [Retrieved on Nov. 27, 2019]. Retrieved from the internet: <URL: https://dl.acm.org/citation.cfm?id=2804304> 12 Pages (129-140) (Year: 2015).*
(Continued)

*Primary Examiner* — Anibal Rivera
(74) *Attorney, Agent, or Firm* — Buchanan Ingersoll & Rooney PC

(57) ABSTRACT

A direct relationship extraction unit generates a direct relationship list indicating a set of a direct dependence source, a direct dependence destination, and a direct dependence type. A storage unit stores an indirect relationship rule including a plurality of direct dependence types, an element relationship, a dependence source element, and a dependence destination element. An indirect relationship extraction unit extracts, from a direct relationship list, a plurality of pieces of direct relationship information corresponding to the plurality of direct dependence types and the element relationship included in the indirect relationship rule,
(Continued)

extracts an indirect dependence source which is an element corresponding to a dependence source element in the indirect relationship rule from the extracted plurality of pieces of direct relationship information, and extracts an indirect dependence destination corresponding to a dependence destination element in the indirect relationship rule from the extracted plurality of pieces of direct relationship information.

11 Claims, 21 Drawing Sheets

(51) Int. Cl.
  *G06F 9/44* (2018.01)
  *G06F 9/46* (2006.01)
  *G06F 8/41* (2018.01)
  *G06F 8/75* (2018.01)
  *G06F 9/445* (2018.01)
  *G06F 8/10* (2018.01)
  *G06F 8/71* (2018.01)
  *G06F 9/38* (2018.01)
  *G06F 9/54* (2006.01)

(52) U.S. Cl.
  CPC ............ *G06F 9/44521* (2013.01); *G06F 8/10* (2013.01); *G06F 8/71* (2013.01); *G06F 9/3838* (2013.01); *G06F 9/54* (2013.01); *G06F 11/3624* (2013.01)

(58) Field of Classification Search
  CPC ........ G06F 16/22; G06F 16/35; G06F 9/3838; G06Q 10/06; G06Q 10/0631
  See application file for complete search history.

(56) References Cited

U.S. PATENT DOCUMENTS

| | | | | |
|---|---|---|---|---|
| 7,664,712 | B1* | 2/2010 | Duval ..................... | G06N 5/02 706/1 |
| 8,464,225 | B2* | 6/2013 | Greifeneder ........ | G06F 11/3644 717/130 |
| 2003/0225761 | A1* | 12/2003 | Wagener ............. | G06F 16/9024 |
| 2006/0130011 | A1* | 6/2006 | Cornell ..................... | G06F 8/10 717/136 |
| 2008/0015788 | A1* | 1/2008 | Onami ..................... | G16B 5/00 702/19 |
| 2008/0276227 | A1* | 11/2008 | Greifeneder ........ | G06F 11/3624 717/130 |
| 2009/0157453 | A1* | 6/2009 | Araki ..................... | G06Q 10/06 705/7.41 |
| 2010/0106655 | A1* | 4/2010 | Schneider ............. | G06Q 10/06 705/301 |
| 2011/0185361 | A1* | 7/2011 | Ng ............................. | G06F 8/71 718/102 |
| 2012/0239446 | A1 | 9/2012 | Araki et al. | |
| 2014/0032552 | A1* | 1/2014 | Cohen ................... | H04L 41/065 707/737 |
| 2015/0058349 | A1* | 2/2015 | Ramnani ................. | G06F 16/35 707/740 |
| 2016/0154727 | A1* | 6/2016 | Broomhall .......... | G06F 11/3672 717/124 |
| 2016/0366020 | A1* | 12/2016 | Ramachandran .. | G06Q 10/0631 |
| 2017/0024310 | A1* | 1/2017 | Andrejko ............ | G06F 11/3672 |
| 2017/0131973 | A1* | 5/2017 | Murakami ................ | G06F 8/10 |
| 2017/0364582 | A1* | 12/2017 | Pan ........................... | G06F 7/08 |
| 2018/0081691 | A1* | 3/2018 | Kulkarni ............... | G06F 9/3838 |
| 2018/0322919 | A1* | 11/2018 | Song ....................... | G11C 11/54 |

FOREIGN PATENT DOCUMENTS

| | | |
|---|---|---|
| JP | 2013069086 A | 4/2013 |
| JP | 2013125466 A | 6/2013 |
| JP | 2014112324 A | 6/2014 |
| JP | 2015069332 A | 4/2015 |
| JP | 2015138356 A | 7/2015 |

OTHER PUBLICATIONS

Ulf Norell, Interactive programming with dependent types, Sep. 25-27, 2013, [Retrieved on Nov. 27, 2019]. Retrieved from the internet: <URL: https://dl.acm.org/citation.cfm?id=2500610> 2 Pages (1-2) (Year: 2013).*

Yu et al., "Hidden Dependencies in Program Comprehension and Change Propagation", Program Comprehension, 2001. IWCP 2001. Proceedings. 9th International Workshop on May 12-13, 2001, Piscataway, NJ, USA,IEEE, May 12, 2001 (May 12, 2001), pp. 293-299, XP010541029.

Mohammed et al., "Analyzing the ripple effects of change in business process models", INMIC, IEEE, Dec. 19, 2013 (Dec. 19, 2013), pp. 31-36, XP032562418.

Extended European Search Report dated Apr. 11, 2019, issued by the European Patent Office in corresponding European Application No. 16900410.8. (8 pages).

International Search Report (PCT/ISA/210) dated Jun. 28, 2016, by the Japanese Patent Office as the International Searching Authority for International Application No. PCT/JP2016/063112.

Lattix User Guide 8.5.2, Nov. 12, 2013, pp. 1-108.

User Manual—V8.x, May 14, 2013, pp. 1-81. (English counterpart of Lattix User Guide).

* cited by examiner

Fig. 3

210: SOURCE CODE (1) file1.c

```
#include "file2.h"

int variable1 = 0;

void func1()
{
    variable1 ++;
} void func2()
{
    int i;
    for (int i= 0; i< MAX; i++)
    {
        func3(variable1);
    }
} void func3(int variable)
{
    func4(variable);
}
```

(2) file2.h

```
define MAX 3 void func1(void);
void func2(void);
void func3(int);
void func4(int);
```

Fig. 4

220: DIRECT RELATIONSHIP LIST

| DIRECT DEPENDENCE SOURCE | DIRECT DEPENDENCE DESTINATION | DIRECT DEPENDENCE TYPE | DIRECT DEPENDENCE FREQUENCY |
|---|---|---|---|
| file1.c | file2.h | INCLUDE | 1 |
| file1.c | file2.h/MAX | MACRO | 2 |
| file1.c/func1() | file1.c/variable1 | WRITE TO VARIABLE | 1 |
| file1.c/func2() | file1.c/variable1 | REFERENCE TO VARIABLE | 1 |
| file1.c/func2() | file1.c/func3() | CALL OF FUNCTION | 3 |
| file1.c/func3() | file1.c/func4() | CALL OF FUNCTION | 1 |

Fig. 5

230: INDIRECT RELATIONSHIP RULE LIST

| RULE No. | INDIRECT RELATIONSHIP CONDITION | | INDIRECT RELATIONSHIP | | |
|---|---|---|---|---|---|
| | | | DEPENDENCE SOURCE ELEMENT | DEPENDENCE DESTINATION ELEMENT | INDIRECT DEPENDENCE TYPE |
| 1 | FIRST DIRECT DEPENDENCE TYPE | FUNCTION α → VARIABLE γ "WRITE TO VARIABLE" | FUNCTION β | FUNCTION α | VARIABLE MEDIATION |
| | SECOND DIRECT DEPENDENCE TYPE | FUNCTION β → VARIABLE ω "REFERENCE TO VARIABLE" | | | |
| | ELEMENT RELATIONSHIP | VARIABLE γ BEING THE SAME AS VARIABLE ω | | | |
| 2 | FIRST DIRECT DEPENDENCE TYPE | FUNCTION α → FUNCTION γ "CALL OF FUNCTION" | FUNCTION α | FUNCTION ω | FUNCTION MEDIATION |
| | SECOND DIRECT DEPENDENCE TYPE | FUNCTION β → FUNCTION ω "CALL OF FUNCTION" | | | |
| | ELEMENT RELATIONSHIP | FUNCTION γ BEING THE SAME AS FUNCTION β | | | |

Fig. 6

240: INDIRECT RELATIONSHIP LIST

| INDIRECT DEPENDENCE SOURCE | INDIRECT DEPENDENCE DESTINATION | INDIRECT DEPENDENCE TYPE | INDIRECT DEPENDENCE FREQUENCY |
|---|---|---|---|
| file1.c/func2() | file1.c/func1() | VARIABLE MEDIATION | 1 |
| file1.c/func2() | file1.c/func4() | FUNCTION MEDIATION | 3 |

Fig.12

(1) DIRECT RELATIONSHIP LIST 220 CORRESPONDING TO SYSTEM 1

| DIRECT DEPENDENCE SOURCE | DIRECT DEPENDENCE DESTINATION | DIRECT DEPENDENCE TYPE | DIRECT DEPENDENCE FREQUENCY |
|---|---|---|---|
| file3.c/func5() | send() | CALL OF FUNCTION | 1 |

(2) DIRECT RELATIONSHIP LIST 220 CORRESPONDING TO SYSTEM 2

| DIRECT DEPENDENCE SOURCE | DIRECT DEPENDENCE DESTINATION | DIRECT DEPENDENCE TYPE | DIRECT DEPENDENCE FREQUENCY |
|---|---|---|---|
| file4.c/func6() | recv() | CALL OF FUNCTION | 1 |
| file4.c/func7() | send() | CALL OF FUNCTION | 1 |

(3) DIRECT RELATIONSHIP LIST 220 CORRESPONDING TO SYSTEM 3

| DIRECT DEPENDENCE SOURCE | DIRECT DEPENDENCE DESTINATION | DIRECT DEPENDENCE TYPE | DIRECT DEPENDENCE FREQUENCY |
|---|---|---|---|
| file5.c/func8() | recv() | CALL OF FUNCTION | 1 |

Fig. 13

250: INDIRECT RELATIONSHIP RULE LIST

| RULE No. | INDIRECT RELATIONSHIP CONDITION | | INDIRECT RELATIONSHIP | | |
|---|---|---|---|---|---|
| | | | DEPENDENCE SOURCE ELEMENT | DEPENDENCE DESTINATION ELEMENT | INDIRECT DEPENDENCE TYPE |
| 1 | FIRST DIRECT DEPENDENCE TYPE | FUNCTION B OF SYSTEM A → SEND FUNCTION C "CALL OF FUNCTION" | FUNCTION E | FUNCTION B | COMMUNICATION MEDIATION |
| | SECOND DIRECT DEPENDENCE TYPE | FUNCTION E OF SYSTEM D → RECEIVE FUNCTION F "CALL OF FUNCTION" | | | |
| | SYSTEM RELATIONSHIP | SYSTEM A BEING DIFFERENT FROM SYSTEM D | | | |

Fig. 14

240: INDIRECT RELATIONSHIP LIST

| INDIRECT DEPENDENCE SOURCE | INDIRECT DEPENDENCE DESTINATION | INDIRECT DEPENDENCE TYPE | INDIRECT DEPENDENCE FREQUENCY |
|---|---|---|---|
| SYSTEM 2 /file4.c/func6() | SYSTEM 1 /file3.c/func5() | COMMUNICATION MEDIATION | 1 |
| SYSTEM 3 /file5.c/func8() | SYSTEM 1 /file3.c/func5() | COMMUNICATION MEDIATION | 1 |
| SYSTEM 3 /file5.c/func8() | SYSTEM 2 /file4.c/func7() | COMMUNICATION MEDIATION | 1 |

| EVENT No. | FIRST COMMUNICATION SYSTEM | SECOND COMMUNICATION SYSTEM |
|---|---|---|
| 1 | SYSTEM 1 | SYSTEM 2 |
| 2 | SYSTEM 2 | SYSTEM 3 |

260:EVENT DATA

Fig. 19

240: INDIRECT RELATIONSHIP LIST

| INDIRECT DEPENDENCE SOURCE | INDIRECT DEPENDENCE DESTINATION | INDIRECT DEPENDENCE TYPE | INDIRECT DEPENDENCE FREQUENCY |
|---|---|---|---|
| SYSTEM 2 /file4.c/func6() | SYSTEM 1 /file3.c/func5() | COMMUNICATION MEDIATION | 1 |
| SYSTEM 3 /file5.c/func8() | SYSTEM 2 /file4.c/func7() | COMMUNICATION MEDIATION | 1 |

DEPENDENCE RELATIONSHIP EXTRACTION APPARATUS AND COMPUTER READABLE MEDIUM

TECHNICAL FIELD

The present invention relates to a technique for extracting an indirect dependence relationship between elements included in software.

BACKGROUND ART

When a change is made to a portion of software, portions other than the changed portion may be affected by the change. Any omission of extraction of portions which are affected by the change could become factors of production of failures. Therefore, it is necessary to extract all of the portions which are affected by the change.

However, due to the growing complexity and scale of software, it is difficult to visually extract all of the portions which are affected by the change.

Techniques of extracting direct dependence relationships which are affected by a change are disclosed in Patent Literature 1, Patent Literature 2, and Patent Literature 3. Moreover, techniques of extracting an indirect dependence relationship by sequentially tracking direct dependence relationships are also disclosed.

In the techniques disclosed in these patent literatures, while it is possible to extract an indirect dependence relationship that is able to be reached by sequentially tracking direct dependence relationships, it is impossible to extract an indirect dependence relationship that is not reached even by sequentially tracking direct dependence relationships.

For example, in a case where there is a dependence relationship from a component A to a component B and there is a dependence relationship from the component B to a component C, it is possible to extract an indirect dependence relationship from the component A to the component C. However, in a case where there is a dependence relationship from the component A to the component B and there is a dependence relationship from the component C to the component B, it is impossible to extract an indirect dependence relationship from the component A to the component C.

CITATION LIST

Patent Literature

Patent Literature 1: JP-A-2015-069332
Patent Literature 2: JP-A-2013-069086
Patent Literature 3: JP-A-2012-230538

SUMMARY OF INVENTION

Technical Problem

An object of the invention is to make it possible to extract an indirect dependence relationship that is not reached even by sequentially tracking direct dependence relationships.

Solution to Problem

A dependence relationship extraction apparatus according to the present invention includes:
a storage unit to store a direct relationship list including a set of a direct dependence source which is, among elements included in software, an element that uses another element included in the software, a direct dependence destination which is, among the elements included in the software, an element that is used by the direct dependence source, and a direct dependence type indicating a method in which the direct dependence source uses the direct dependence destination; and an indirect relationship extraction unit to, with use of an indirect relationship rule serving as a rule with respect to an indirect dependence source which is, among the elements included in the software, an element that is affected by another element included in the software and an indirect dependence destination which is, among the elements included in the software, an element that affects the indirect dependence source, and the direct relationship list, extract a set of the indirect dependence source and the indirect dependence destination.

Advantageous Effects of Invention

According to the invention, a set of an indirect dependence source and an indirect dependence destination which have an indirect dependence relationship can be extracted according to an indirect relationship rule.

Accordingly, preparing an indirect relationship rule corresponding to an indirect dependence relationship that is not reached even by sequentially tracking direct dependence relationships enables extracting a set of an indirect dependence source and an indirect dependence destination which have an indirect dependence relationship that is not reached even by sequentially tracking direct dependence relationships.

BRIEF DESCRIPTION OF DRAWINGS

FIG. 3 is a diagram illustrating source code 210 in the embodiment 1.

FIG. 4 is a diagram illustrating a direct relationship list 220 in the embodiment 1.

FIG. 5 is a diagram illustrating an indirect relationship rule list 230 in the embodiment 1.

FIG. 6 is a diagram illustrating an indirect relationship list 240 in the embodiment 1.

FIG. 12 is a diagram illustrating a direct relationship list 220 for each system in the embodiment 2.

FIG. 13 is a diagram illustrating an indirect relationship rule list 250 in the embodiment 2.

FIG. 14 is a diagram illustrating an indirect relationship list 240 in the embodiment 2.

FIG. 19 is a diagram illustrating an indirect relationship list 240 in the embodiment 3.

DESCRIPTION OF EMBODIMENTS

Figure 1:
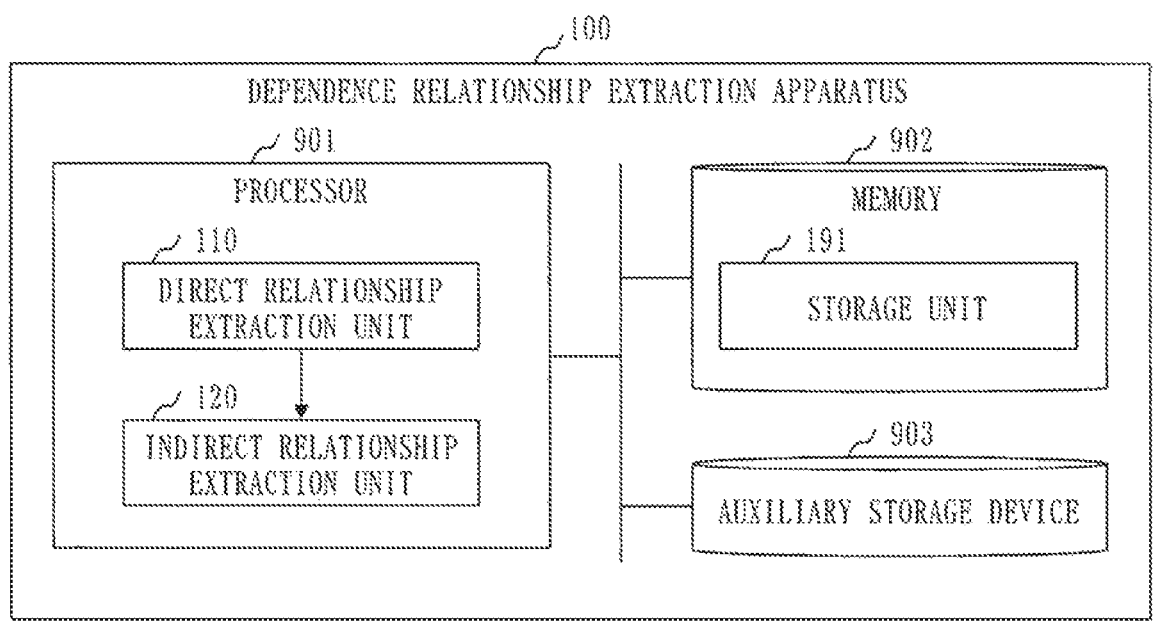
FIG. 1 is a configuration diagram of a dependence relationship extraction apparatus 100 in an embodiment 1.

In the embodiments and drawings, the same elements or mutually corresponding elements are assigned with the respective same reference characters. The re-description about the elements assigned with the same reference characters are omitted or simplified as appropriate.

Embodiment 1

A dependence relationship extraction apparatus 100, which extracts an indirect dependence relationship, is described based on FIG. 1 to FIG. 9.

Description of Configuration

A configuration of the dependence relationship extraction apparatus 100 is described based on FIG. 1.

The dependence relationship extraction apparatus 100 is a computer including hardware such as a processor 901, a memory 902, and an auxiliary storage device 903. These pieces of hardware are connected to each other via signal lines.

The processor 901 is an integrated circuit (IC) which performs processing, and controls other pieces of hardware. Specifically, the processor 901 is a CPU, a DSP, or a GPU. CPU is an abbreviation for central processing unit, DSP is an abbreviation for digital signal processor, and GPU is an abbreviation for graphics processing unit.

The memory 902 is a volatile storage device. The memory 902 is also called a main storage device or a main memory. Specifically, the memory 902 is a random access memory (RAM).

The auxiliary storage device 903 is a non-volatile storage device. Specifically, the auxiliary storage device 903 is a ROM, an HDD, or a flash memory. ROM is an abbreviation for read-only memory, and HDD is an abbreviation for hard disk drive.

Hardware obtained by integrating the processor 901, the memory 902, and the auxiliary storage device 903 is referred to as a "processing circuitry".

The dependence relationship extraction apparatus 100 includes, as elements of a functional configuration, "units" such as a direct relationship extraction unit 110 and an indirect relationship extraction unit 120. The functions of "units" are implemented by software. The functions of "units" are described below.

A program for implementing the functions of "units" is stored in the auxiliary storage device 903. The program for implementing the functions of "units" is loaded onto the memory 902 and is then executed by the processor 901.

Furthermore, an operating system (OS) is stored in the auxiliary storage device 903. At least a part of the OS is loaded onto the memory 902 and is then executed by the processor 901.

Thus, the processor 901 executes the program for implementing the functions of "units" while executing the OS.

Data obtained by executing the program for implementing the functions of "units" is stored in a storage device such as the memory 902, the auxiliary storage device 903, a register included in the processor 901, or a cache memory included in the processor 901.

The memory 902 functions as a storage unit 191 in which data to be used, generated, input or output, or transmitted or received by the dependence relationship extraction apparatus 100 is stored. However, another storage device can function as the storage unit 191.

The dependence relationship extraction apparatus 100 can include a plurality of processors as an alternative to the processor 901. The plurality of processors share execution of the program for implementing the functions of "units".

The program for implementing the functions of "units" can be stored in a non-volatile storage medium, such as a magnetic disc, an optical disc, or a flash memory, in a computer-readable manner. The non-volatile storage medium is a non-transitory tangible medium.

"Unit" can be replaced with "processing" or "stage". The function of a "unit" can be implemented by firmware.

Description of Operation

An operation of the dependence relationship extraction apparatus 100 corresponds to a dependence relationship extraction method. Moreover, a procedure of the dependence relationship extraction method corresponds to a procedure of a dependence relationship extraction program.

Figure 2:
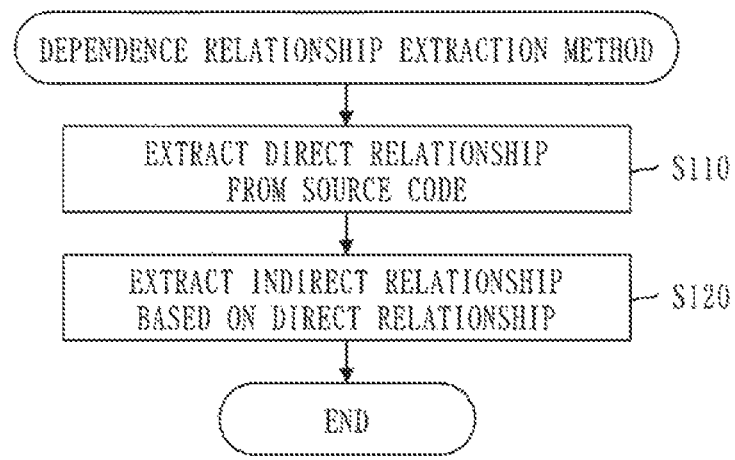
FIG. 2 is a flowchart of a dependence relationship extraction method in the embodiment 1.

The dependence relationship extraction method is described based on FIG. 2.

Step S110 is direct relationship extraction processing.

In step S110, the direct relationship extraction unit 110 extracts a direct relationship from source code 210, and generates a direct relationship list 220 indicating the extracted direct relationship.

The source code 210 is previously stored in the storage unit 191. The storage unit 191 stores the generated direct relationship list 220.

The source code 210 is a file in which processing of software is described, and is also called a "source program" or a "source file". The source code 210 includes a description for using elements which configure software. Specific elements which configure software are, for example, source code, functions, variables, and constants.

A direct relationship means a direct dependence relationship between elements which configure software.

The direct relationship list 220 is a list of direct relationship information. The direct relationship information is information indicating a direct relationship. Specific direct relationship information is a set of a direct dependence source, a direct dependence destination, a direct dependence type, and a direct dependence frequency.

The direct dependence source is an element which is one of the elements included in software and which uses another element included in the software.

The direct dependence destination is an element which is one of the elements included in software and which is used by the direct dependence source.

The direct dependence type is the type of a method in which the direct dependence source uses the direct dependence destination.

The direct dependence frequency is a value corresponding to the number of times the direct dependence source uses the direct dependence destination.

Specifically, the direct relationship extraction unit 110 performs analysis, such as syntax analysis or lexical analysis, on the source code 210, and extracts direct relationships based on the analysis result. Then, the direct relationship extraction unit 110 generates the direct relationship list 220 indicating the extracted direct relationships.

Since the method for extracting direct relationships is conventional art, details of the method for extracting direct relationships are omitted.

FIG. 3 illustrates specific source code 210.

(1) of FIG. 3 is source code 210 having a file name called "file1.c". The source code 210 of "file1.c" includes a description for using elements, such as source code "file2.h", functions "func1( )", "func2( )", "func3( )", and "func4( )", a variable "variable1", and a constant "MAX".

(2) of FIG. 3 is source code 210 having a file name called "file2.h". The source code 210 of "file2.h" includes a description for using such an element as a constant "MAX".

FIG. 4 illustrates the direct relationship list 220 which is generated with use of the source code 210 illustrated in FIG. 3.

The direct relationship list 220 includes six pieces of direct relationship information. Each piece of direct relationship information is a set of a direct dependence source, a direct dependence destination, a direct dependence type, and a direct dependence frequency.

The first piece of direct relationship information indicates such a direct relationship that the source code "file1.c" includes the source code "file2.h". The direct dependence frequency is 1.

The second piece of direct relationship information indicates such a direct relationship that the source code "file1.c" reads the constant "MAX" of the source code "file2.h" with a macro. The direct dependence frequency is 2.

The third piece of direct relationship information indicates such a direct relationship that the function "func1( )" of the source code "file1.c" writes to the variable "variable1" of the source code "file1.c". The direct dependence frequency is 1.

The fourth piece of direct relationship information indicates such a direct relationship that the function "func2( )" of the source code "file1.c" refers to the variable "variable1" of the source code "file1.c". The direct dependence frequency is 1.

The fifth piece of direct relationship information indicates such a direct relationship that the function "func2( )" of the source code "file1.c" calls the function "func3( )" of the source code "file1.c". The direct dependence frequency is 3.

The sixth piece of direct relationship information indicates such a direct relationship that the function "func3( )" of the source code "file1.c" calls the function "func4( )" of the source code "file1.c". The direct dependence frequency is 1.

Referring back to FIG. 2, step S120 is described.

Step S120 is indirect relationship extraction processing.

In step S120, the indirect relationship extraction unit 120 extracts an indirect relationship with use of the direct relationship list 220, and generates an indirect relationship list 240 indicating the extracted indirect relationship. The storage unit 191 stores the generated indirect relationship list 240.

The indirect relationship means an indirect dependence relationship between elements which configure software.

The indirect relationship list 240 is a list of indirect relationship information. The indirect relationship information is information indicating an indirect relationship. Specific indirect relationship information is a set of an indirect dependence source, an indirect dependence destination, an indirect dependence type, and an indirect dependence frequency.

The indirect dependence source is an element which is one of the elements included in software and which is affected by another element included in the software. However, the direct dependence source is excepted.

The indirect dependence destination is an element which is one of the elements included in software and which affects the indirect dependence source. However, the direct dependence destination is excepted.

The indirect dependence type is the type of a method in which the indirect dependence destination affects the indirect dependence source.

The indirect dependence frequency is a value corresponding to the number of times the indirect dependence destination affects the indirect dependence source.

Specifically, the indirect relationship extraction unit 120 extracts an indirect relationship using the direct relationship list 220 and an indirect relationship rule list 230. Then, the indirect relationship extraction unit 120 generates the indirect relationship list 240 indicating the extracted indirect relationship. The indirect relationship rule list 230 is previously stored in the storage unit 191.

The indirect relationship rule list 230 is a list of indirect relationship rules.

Each indirect relationship rule is a rule between elements having an indirect relationship with each other.

Each indirect relationship rule includes a plurality of direct dependence types, an element relationship, a dependence source element, a dependence destination element, and an indirect dependence type.

The element relationship is a relationship holding between a plurality of elements.

The dependence source element is an element serving as an indirect dependence source.

The dependence destination element is an element serving as an indirect dependence destination.

Specifically, the indirect relationship extraction unit 120 extracts the indirect dependence source and the indirect dependence destination in the following way.

The indirect relationship extraction unit 120 extracts, from the direct relationship list 220, a plurality of pieces of direct relationship information corresponding to a plurality of direct dependence types and an element relationship included in an indirect relationship rule.

Then, the indirect relationship extraction unit 120 extracts, as an indirect dependence source, an element corresponding to a dependence source element included in the indirect relationship rule from among a plurality of direct dependence sources and a plurality of direct dependence destinations included in the extracted plurality of pieces of direct relationship information.

Moreover, the indirect relationship extraction unit 120 extracts, as an indirect dependence destination, an element corresponding to a dependence destination element included in the indirect relationship rule from among a plurality of direct dependence sources and a plurality of direct dependence destinations included in the extracted plurality of pieces of direct relationship information.

The plurality of pieces of direct relationship information extracted from the direct relationship list 220 satisfies all of the following conditions (1) to (3).

(1) The plurality of pieces of direct relationship information is composed of the same number of pieces of direct relationship information as the number of pieces of direct dependence types included in a plurality of direct dependence types in the indirect relationship rule.

(2) The plurality of pieces of direct relationship information includes a plurality of direct dependence sources, a plurality of direct dependence destinations, and a plurality of direct dependence types in the indirect relationship rule.

(3) The plurality of pieces of direct relationship information has an element relationship with a plurality of elements corresponding to an element relationship in the indirect relationship rule among a plurality of direct dependence sources and a plurality of direct dependence destinations.

FIG. 5 illustrates a specific indirect relationship rule list 230.

The indirect relationship rule list 230 includes two indirect relationship rules.

Each indirect relationship rule includes an indirect relationship condition and an indirect relationship.

The indirect relationship condition includes a plurality of direct dependence types and an element relationship.

The indirect relationship includes a dependence source element, a dependence destination element, and an indirect dependence type.

An indirect relationship rule of "No. 1" is described.

The first direct dependence type is a write to a variable $\gamma$ from a function $\alpha$. The function $\alpha$ is a direct dependence source corresponding to the first direct dependence type, and the variable $\gamma$ is a direct dependence destination corresponding to the first direct dependence type.

The second direct dependence type is a reference to a variable $\omega$ from a function $\beta$. The function $\beta$ is a direct dependence source corresponding to the second direct dependence type, and the variable $\omega$ is a direct dependence destination corresponding to the second direct dependence type.

The element relationship is a relationship between the direct dependence destination corresponding to the first direct dependence type and the direct dependence destination corresponding to the second direct dependence type. Specifically, the element relationship is a coincidence between the variable $\gamma$ and the variable $\omega$.

The dependence source element is a direct dependence source corresponding to the second direct dependence type. Specifically, the dependence source element is the function $\beta$.

The dependence destination element is a direct dependence source corresponding to the first direct dependence type. Specifically, the dependence destination element is the function $\alpha$.

The indirect dependence type is variable mediation. The variable mediation means an indirect dependence relationship mediated by a variable.

An indirect relationship rule of "No. 2" is described.

The first direct dependence type is a call of a function $\gamma$ from a function $\alpha$. The function $\alpha$ is a direct dependence source corresponding to the first direct dependence type, and the function $\gamma$ is a direct dependence destination corresponding to the first direct dependence type.

The second direct dependence type is a call of a function $\omega$ from a function $\beta$. The function $\beta$ is a direct dependence source corresponding to the second direct dependence type, and the function $\omega$ is a direct dependence destination corresponding to the second direct dependence type.

The element relationship is a relationship between the direct dependence destination corresponding to the first direct dependence type and the direct dependence source corresponding to the second direct dependence type. Specifically, the element relationship is a coincidence between the function $\gamma$ and the function $\beta$.

The dependence source element is a direct dependence source corresponding to the first direct dependence type. Specifically, the dependence source element is the function $\alpha$.

The dependence destination element is a direct dependence destination corresponding to the second direct dependence type. Specifically, the dependence destination element is the function $\omega$.

The indirect dependence type is function mediation. The function mediation means an indirect dependence relationship mediated by a function.

FIG. 6 illustrates the indirect relationship list 240 which is generated with use of the indirect relationship rule list 230 illustrated in FIG. 5.

The indirect relationship list 240 includes two pieces of indirect relationship information.

Each piece of indirect relationship information is a set of an indirect dependence source, an indirect dependence destination, an indirect dependence type, and an indirect dependence frequency.

The first piece of indirect relationship information indicates such an indirect relationship that the function "func2( )" of the source code "file1.c" is affected by the function "func1( )" of the source code "file1.c" through the mediation of a variable. The indirect dependence frequency is 1.

The second piece of indirect relationship information indicates such an indirect relationship that the function "func2( )" of the source code "file1.c" is affected by the function "func4( )" of the source code "file1.c" through the mediation of a function. The indirect dependence frequency is 3.

Figure 7:
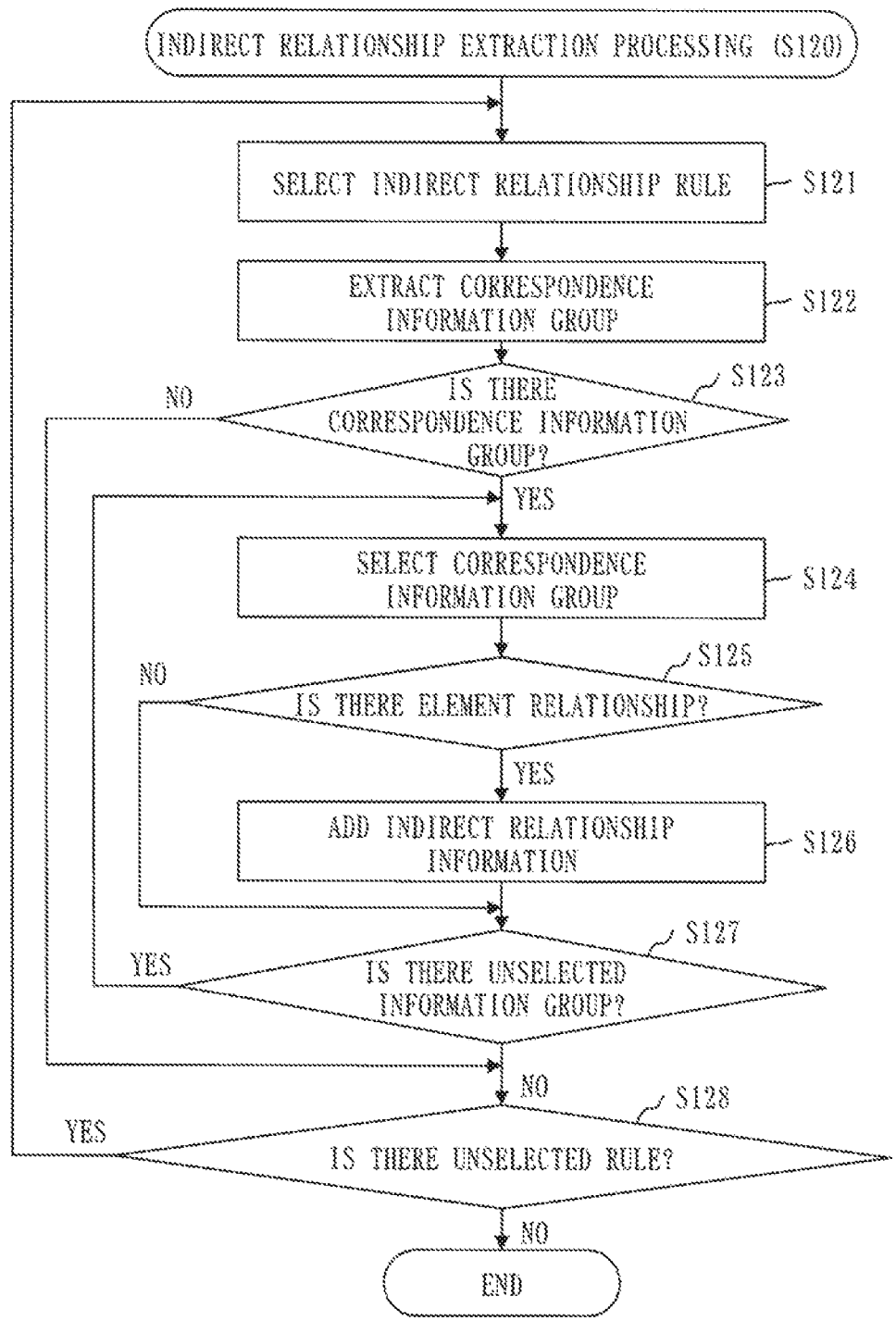
FIG. 7 is a flowchart of indirect relationship extraction processing (S120) in the embodiment 1.

A procedure of the indirect relationship extraction processing (S120) is described based on FIG. 7.

In step S121, the indirect relationship extraction unit 120 selects one unselected indirect relationship rule from the indirect relationship rule list 230.

Step S122 to step S127 are performed with respect to the indirect relationship rule selected in step S121.

In step S122, the indirect relationship extraction unit 120 extracts a correspondence information group from the direct relationship list 220.

The correspondence information group is a plurality of pieces of direct relationship information corresponding to a plurality of direct dependence types in the indirect relationship rule. In other words, the correspondence information group is composed of the same number of pieces of direct relationship information as the number of direct dependence types in the indirect relationship rule. Then, for each direct dependence type in the indirect relationship rule, the correspondence information group includes one piece of direct relationship information including the same direct dependence type as the direct dependence type in the indirect relationship rule.

In a case where there is a plurality of correspondence information groups, the indirect relationship extraction unit 120 extracts a plurality of correspondence information groups.

Specifically, the indirect relationship extraction unit 120 extracts a correspondence information group in the following way.

For each direct dependence type in the indirect relationship rule, the indirect relationship extraction unit 120 extracts direct relationship information corresponding to the direct dependence type from the direct relationship list 220. The direct relationship information corresponding to the direct dependence type is direct relationship information including its direct dependence type.

Then, for each direct dependence type in the indirect relationship rule, the indirect relationship extraction unit 120 selects one piece of direct relationship information from the extracted direct relationship information. A set of selected pieces of direct relationship information configures a correspondence information group.

Step S122 is specifically described based on FIG. 4 and FIG. 5.

In the indirect relationship rule of "No. 1" included in FIG. 5, the first direct dependence type is a "write to variable". Accordingly, the indirect relationship extraction unit 120 extracts the third piece of direct relationship information as the first direct relationship information from the direct relationship list 220 illustrated in FIG. 4.

In the indirect relationship rule of "No. 1" included in FIG. 5, the second direct dependence type is a "reference to variable". Accordingly, the indirect relationship extraction unit 120 extracts the fourth piece of direct relationship information as the second direct relationship information from the direct relationship list 220 illustrated in FIG. 4.

As a result, the first direct relationship information and the second direct relationship information configure a correspondence information group.

Referring back to FIG. 7, the description continues with step S123.

In step S123, the indirect relationship extraction unit 120 determines whether there is a correspondence information group. If at least one correspondence information group is extracted in step S122, the indirect relationship extraction unit 120 determines that there is a correspondence information group.

If there is a correspondence information group, processing proceeds to step S124.

If there is no correspondence information group, processing proceeds to step S128.

In step S124, the indirect relationship extraction unit 120 selects one unselected correspondence information group.

Step S125 and step S126 are performed with respect to the correspondence information group selected in step S124.

In step S125, the indirect relationship extraction unit 120 determines whether the element relationship in the indirect relationship rule holds between a plurality of elements corresponding to the element relationship in the indirect relationship rule.

Specifically, the indirect relationship extraction unit 120 extracts, from the correspondence information group, a plurality of elements corresponding to the element relationship in the indirect relationship rule. Then, the indirect relationship extraction unit 120 determines whether the element relationship in the indirect relationship rule holds between the extracted plurality of elements.

If the element relationship in the indirect relationship rule holds between the plurality of elements corresponding to the element relationship in the indirect relationship rule, processing proceeds to step S126.

If the element relationship in the indirect relationship rule does not hold between the plurality of elements corresponding to the element relationship in the indirect relationship rule, processing proceeds to step S127.

Step S125 is specifically described based on FIG. 4 and FIG. 5.

In the indirect relationship rule of "No. 1" included in FIG. 5, the first direct relationship information corresponding to the first direct dependence type is the third piece of direct relationship information included in FIG. 4, and the second direct relationship information corresponding to the second direct dependence type is the fourth piece of direct relationship information included in FIG. 4.

In the indirect relationship rule of "No. 1", a plurality of elements corresponding to the element relationship is two elements, that is, a variable $\gamma$ and a variable $\omega$.

The variable $\gamma$ is the direct dependence destination corresponding to the first direct dependence type. The direct dependence destination corresponding to the first direct dependence type is the direct dependence destination included in the first direct relationship information. In other words, the variable $\gamma$ is the variable "variable1" of the source code "file1.c".

The variable $\omega$ is the direct dependence destination corresponding to the second direct dependence type. The direct dependence destination corresponding to the second direct dependence type is the direct dependence destination included in the second direct relationship information. In other words, the variable $\omega$ is the variable "variable1" of the source code "file1.c".

In the indirect relationship rule of "No. 1", the element relationship is a coincidence between the variable $\gamma$ and the variable $\omega$. As mentioned above, since the variable $\gamma$ and the variable $\omega$ are coincident with each other, the element relationship holds between the variable $\gamma$ and the variable $\omega$.

Accordingly, the indirect relationship extraction unit 120 determines that the element relationship in the indirect relationship rule holds between the extracted plurality of elements.

Referring back to FIG. 7, the description continues with step S126.

In step S126, the indirect relationship extraction unit 120 generates indirect relationship information, and adds the generated indirect relationship information to the indirect relationship list 240.

Specifically, the indirect relationship extraction unit 120 generates indirect relationship information in the following way.

First, the indirect relationship extraction unit 120 extracts, from the correspondence information group, the element corresponding to the dependence source element in the indirect relationship rule and the element corresponding to the dependence destination element in the indirect relationship rule. The element corresponding to the dependence source element in the indirect relationship rule serves as an indirect dependence source, and the element corresponding to the dependence destination element in the indirect relationship rule serves as an indirect dependence destination.

Moreover, the indirect relationship extraction unit 120 extracts the indirect dependence type from the indirect relationship rule.

Additionally, the indirect relationship extraction unit 120 extracts the direct dependence frequency from each piece of direct relationship information included in the correspondence information group, and calculates an indirect dependence frequency using the extracted direct dependence frequency.

Then, the indirect relationship extraction unit 120 generates indirect relationship information including the indirect dependence source, the indirect dependence destination, the indirect dependence type, and the indirect dependence frequency.

Step S126 is specifically described based on FIG. 4, FIG. 5, and FIG. 6.

In the indirect relationship rule of "No. 1" included in FIG. 5, the first direct relationship information corresponding to the first direct dependence type is the third piece of direct relationship information included in FIG. 4, and the second direct relationship information corresponding to the second direct dependence type is the fourth piece of direct relationship information included in FIG. 4.

The direct dependence frequency included in the first direct relationship information is 1, the direct dependence frequency included in the second direct relationship information is 1, and an indirect dependence frequency which is calculated with use of these direct dependence frequencies is 1 (=1×1).

In the indirect relationship rule of "No. 1", the dependence source element is a function β, and the dependence destination element is a function α.

The function β is a direct dependence source corresponding to the second direct dependence type. The direct dependence source corresponding to the second direct dependence type is a direct dependence source included in the second direct relationship information. In other words, the function β is the function "func2( )" of the source code "file1.c".

The function α is a direct dependence source corresponding to the first direct dependence type. The direct dependence source corresponding to the first direct dependence type is the direct dependence source included in the first direct relationship information. In other words, the function α is the function "func1( )" of the source code "file1.c".

The indirect relationship extraction unit 120 generates indirect relationship information including an indirect dependence source, the indirect dependence destination, the indirect dependence type, and the indirect dependence frequency, and adds the generated indirect relationship information to the indirect relationship list 240. With this, the first piece of indirect relationship information is added to the indirect relationship list 240 in FIG. 6.

Referring back to FIG. 7, the description continues with step S127.

In step S127, the indirect relationship extraction unit 120 determines whether there is an unselected correspondence information group.

If there is an unselected correspondence information group, processing returns to step S124.

If there is no unselected correspondence information group, processing proceeds to step S128.

In step S128, the indirect relationship extraction unit 120 determines whether there is an unselected indirect relationship rule.

If there is an unselected indirect relationship rule, processing returns to step S121.

If there is no unselected indirect relationship rule, the indirect relationship extraction processing (S120) ends.

Advantageous Effects of Embodiment 1

An indirect dependence relationship that is not reached even by sequentially tracking direct dependence relationships is enabled to be extracted.

Figure 8:
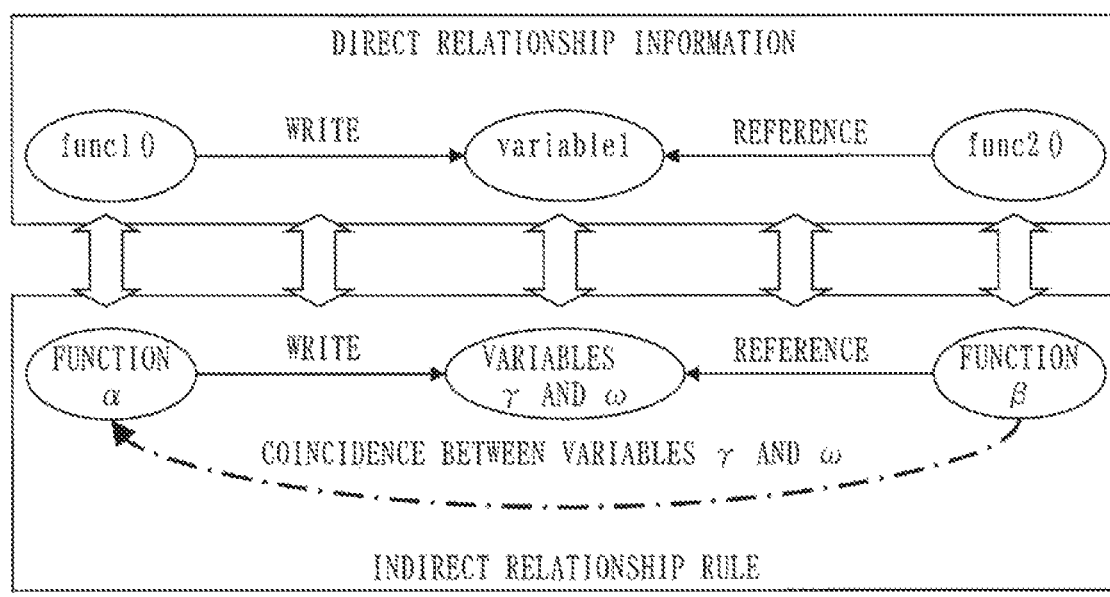
FIG. 8 is a relationship diagram between direct relationship information and an unreachable indirect relationship rule in the embodiment 1.

Specifically, an indirect relationship such as that illustrated in FIG. 8 can be extracted. Solid arrows denote direct relationships, up-down arrows denote pattern match, and a dashed-dotted arrow denotes an indirect relationship.

In FIG. 8, direct relationship information is a write to a variable "variable1" from a function "func1( )" and a reference to a variable "variable1" from a function "func2( )".

Moreover, an indirect relationship rule is a write to a variable γ from a function α, a reference to a variable ω from a function β, and a coincidence between the variable γ and the variable ω. The indirect relationship in a case where such an indirect relationship rule holds is an indirect relationship from the function β to the function α.

When pattern matching is performed on the direct relationship information with respect to the indirect relationship rule, an indirect relationship from the function "func2( )" to the function "func1( )" is obtained.

Moreover, an indirect dependence relationship that is reachable by sequentially tracking direct dependence relationships can also be extracted.

Figure 9:
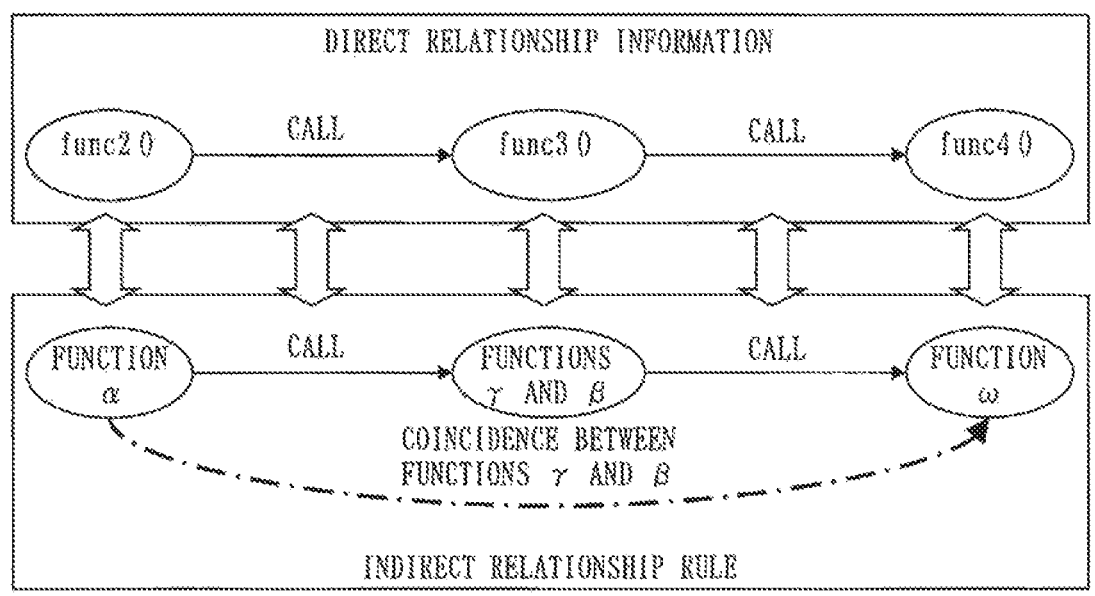
FIG. 9 is a relationship diagram between the direct relationship information and a reachable indirect relationship rule in the embodiment 1.

Specifically, an indirect relationship such as that illustrated in FIG. 9 can be extracted. The denotations of solid arrows, up-down arrows, and a dashed-dotted arrow are the same as those in FIG. 8.

In FIG. 9, direct relationship information is a call to a function "func3( )" from a function "func2( )" and a call to a function "func4( )" from the function "func3( )".

Moreover, an indirect relationship rule is a call to a function γ from a function α, a call to a function ω from a function β, and a coincidence between the function γ and the function β. The indirect relationship in a case where such an indirect relationship rule holds is an indirect relationship from the function α to the function ω.

When pattern matching is performed on the direct relationship information with respect to the indirect relationship rule, an indirect relationship from the function "func2( )" to the function "func4( )" is obtained.

Other Configurations

The indirect relationship rule is not limited to the rules illustrated in FIG. 5.

The number of direct dependence types in the indirect relationship rule can be three or more.

The element relationship in the indirect relationship rule can be a relationship between three or more elements.

Each of the dependence source element and the dependence destination element in the indirect relationship rule can be a plurality of elements.

The type of an indirect relationship rule included in the indirect relationship rule list 230 can be any one of an unreachable indirect relationship rule and a reachable indirect relationship rule. The unreachable indirect relationship rule is an indirect relationship rule directed to an indirect dependence relationship that is not reached even by sequentially tracking direct dependence relationships, and the reachable indirect relationship rule is an indirect relationship rule directed to an indirect dependence relationship that is reachable by sequentially tracking direct dependence relationships.

Embodiment 2

Regarding an embodiment which extracts an indirect dependence relationship between systems, differences from the embodiment 1 are mainly described based on FIG. 10 to FIG. 15.

Description of Configuration

A configuration of the dependence relationship extraction apparatus 100 is the same as that in the embodiment 1.

However, a plurality of pieces of source code 210 corresponding to a plurality of systems which communicates with each other is previously stored in the storage unit 191.

Description of Operation

Figure 10:
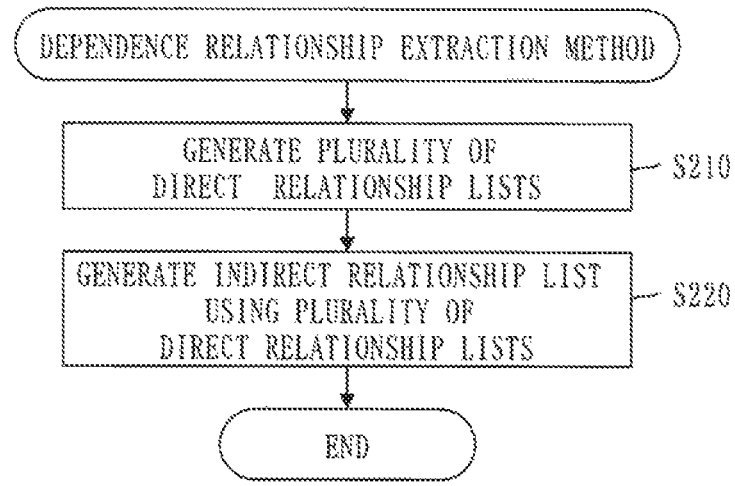
FIG. 10 is a flowchart of a dependence relationship extraction method in an embodiment 2.

A dependence relationship extraction method is described based on FIG. 10.

Step S210 is direct relationship extraction processing.

In step S210, the direct relationship extraction unit 110 generates a plurality of direct relationship lists 220 corresponding to a plurality of systems with use of a plurality of pieces of source code 210. The storage unit 191 stores the generated plurality of direct relationship lists 220.

Specifically, with respect to each system, the direct relationship extraction unit 110 generates a direct relationship list 220 corresponding to the system with use of source code 210 corresponding to the system. With this, the direct relationship list 220 for each system is generated.

The method of generating each direct relationship list 220 is the same as that in the embodiment 1.

The configuration of each direct relationship list 220 is the same as that in the embodiment 1.

Figure 11:
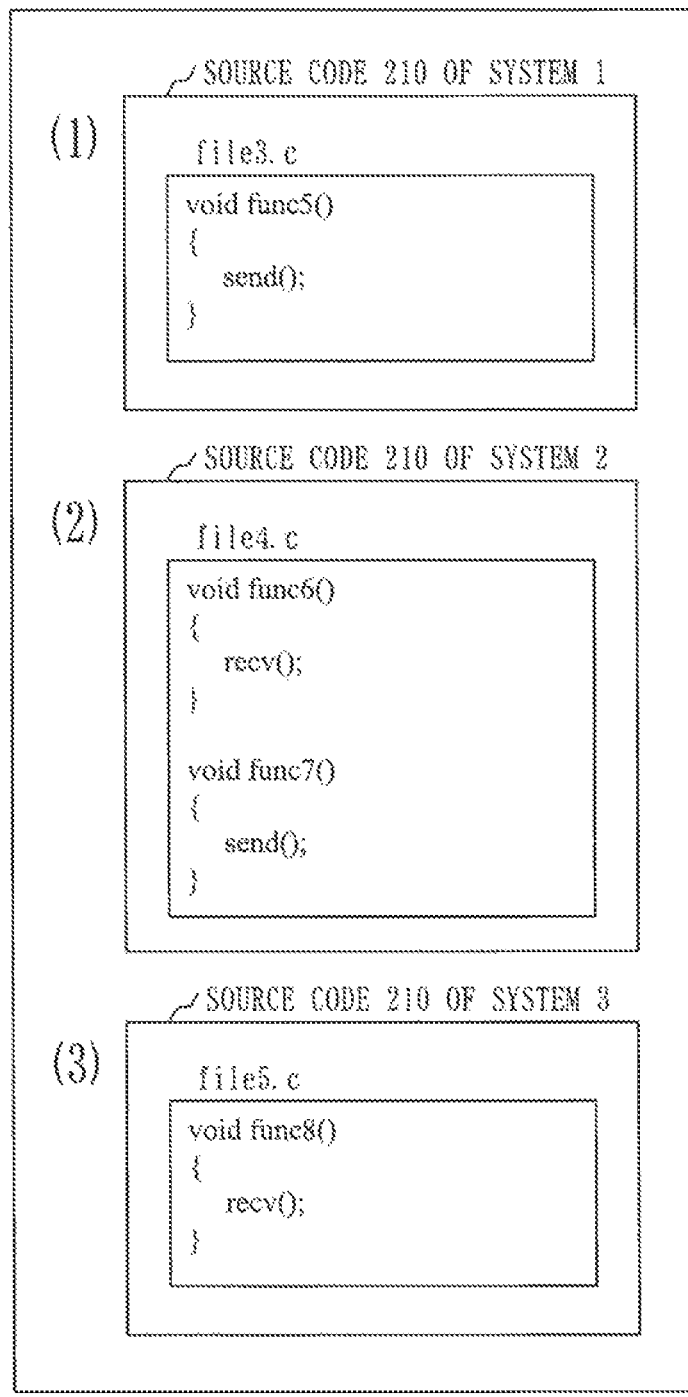
FIG. 11 is a diagram illustrating source code 210 for each system in the embodiment 2.

FIG. 11 illustrates specific pieces of source code 210.

(1) of FIG. 11 is source code 210 of a system 1. The source code 210 of the system 1 includes a description for using such elements as a function "func5( )" and a function "send( )". The function "send( )" is a send function for transmitting data.

(2) of FIG. 11 is source code 210 of a system 2. The source code 210 of the system 2 includes a description for using such elements as a function "func6( )", a function "func7( )", a function "recv( )", and the function "send( )". The function "recv( )" is a receive function for receiving data.

(3) of FIG. 11 is source code 210 of a system 3. The source code 210 of the system 3 includes a description for using such elements as a function "func8( )" and the function "recv( )".

FIG. 12 illustrates direct relationship lists 220 which are generated with use of the pieces of source code 210 illustrated in FIG. 11.

(1) of FIG. 12 is a direct relationship list 220 corresponding to the system 1. The direct relationship list 220 corresponding to the system 1 includes one piece of direct relationship information. The direct relationship information indicates such a direct relationship that the function "func5( )" of the source code "file3.c" calls the send function "send( )". The direct dependence frequency is 1.

(2) of FIG. 12 is a direct relationship list 220 corresponding to the system 2. The direct relationship list 220 corresponding to the system 2 includes two pieces of direct relationship information. The first piece of direct relationship information indicates such a direct relationship that the function "func6( )" of the source code "file4.c" calls the receive function "recv( )". The direct dependence frequency is 1. The second piece of direct relationship information indicates such a direct relationship that the function "func7( )" of the source code "file4.c" calls the send function "send( )". The direct dependence frequency is 1. (3) of FIG. 12 is a direct relationship list 220 corresponding to the system 3. The direct relationship list 220 corresponding to the system 3 includes one piece of direct relationship information. That piece of direct relationship information indicates such a direct relationship that the function "func8( )" of the source code "file5.c" calls the receive function "recv( )". The direct dependence frequency is 1.

Step S220 is indirect relationship extraction processing.

In step S220, the indirect relationship extraction unit 120 extracts an indirect relationship between systems using a plurality of direct relationship lists 220 and an indirect relationship rule list 250, and generates an indirect relationship list 240 indicating the extracted indirect relationship. The storage unit 191 stores the generated indirect relationship list 240. The indirect relationship rule list 250 is previously stored in the storage unit 191.

The indirect relationship rule list 250 is a list of indirect relationship rules similar to the indirect relationship rule list 230 described in the embodiment 1.

The indirect relationship rule includes a plurality of direct dependence types, a system relationship, a dependence source element, and a dependence destination element serving as an indirect dependence destination.

The system relationship is a relationship which holds between systems.

Specifically, the indirect relationship extraction unit 120 extracts an indirect dependence source and an indirect dependence destination in the following way.

The indirect relationship extraction unit 120 extracts, from the plurality of direct relationship lists 220, a plurality of pieces of direct relationship information corresponding to a plurality of direct dependence types and a system relationship included in the indirect relationship rule.

Then, the indirect relationship extraction unit 120 extracts, as the indirect dependence source, an element corresponding to a dependence source element included in the indirect relationship rule from among a plurality of direct dependence sources and a plurality of direct dependence destinations included in the extracted plurality of pieces of direct relationship information.

Moreover, the indirect relationship extraction unit 120 extracts, as the indirect dependence destination, an element corresponding to a dependence destination element included in the indirect relationship rule from among a plurality of direct dependence sources and a plurality of direct dependence destinations included in the extracted plurality of pieces of direct relationship information.

FIG. 13 illustrates a specific indirect relationship rule list 250.

The indirect relationship rule list 250 includes one indirect relationship rule.

That indirect relationship rule includes an indirect relationship condition and an indirect relationship.

The indirect relationship condition includes a plurality of direct dependence types and a system relationship.

The indirect relationship includes a dependence source element, a dependence destination element, and an indirect dependence type.

The first direct dependence type is a call of a send function C from a function B of a system A. The system A is a system corresponding to the first direct relationship information including the first direct dependence type, the function B is a direct dependence source included in the first direct relationship information, and the send function C is a direct dependence destination included in the first direct relationship information.

The second direct dependence type is a call of a receive function F from a function E of a system D. The system D is a system corresponding to the second direct relationship information including the second direct dependence type, the function E is a direct dependence source included in the second direct relationship information, and the receive function F is a direct dependence destination included in the second direct relationship information.

The system relationship is a relationship between a system corresponding to the first direct relationship information and a system corresponding to the second direct relationship information. Specifically, the system relationship is a non-coincidence between the system A and the system D.

The dependence source element is a direct dependence source included in the second direct relationship information. Specifically, the dependence source element is the function E.

The dependence destination element is a direct dependence source included in the first direct relationship information. Specifically, the dependence destination element is the function B.

The indirect dependence type is communication mediation. The communication mediation means an indirect dependence relationship mediated by a communication.

FIG. 14 illustrates an indirect relationship list 240 which is generated with use of the indirect relationship rule list 250 illustrated in FIG. 13.

The indirect relationship list 240 includes three pieces of indirect relationship information.

Each piece of indirect relationship information is a set of an indirect dependence source, an indirect dependence destination, an indirect dependence type, and an indirect dependence frequency.

The first piece of indirect relationship information indicates such an indirect relationship that the function "func6( )" of the source code "file4.c" of the system 2 is affected by the function "func5( )" of the source code "file3.c" of the system 1 through the mediation of a communication. The indirect dependence frequency is 1.

The second piece of indirect relationship information indicates such an indirect relationship that the function "func8( )" of the source code "file5.c" of the system 3 is affected by the function "func5( )" of the source code "file3.c" of the system 1 through the mediation of a communication. The indirect dependence frequency is 1.

The third piece of indirect relationship information indicates such an indirect relationship that the function "func8( )" of the source code "file5.c" of the system 3 is affected by the function "func7( )" of the source code "file4.c" of the system 2 through the mediation of a communication. The indirect dependence frequency is 1.

Figure 15:
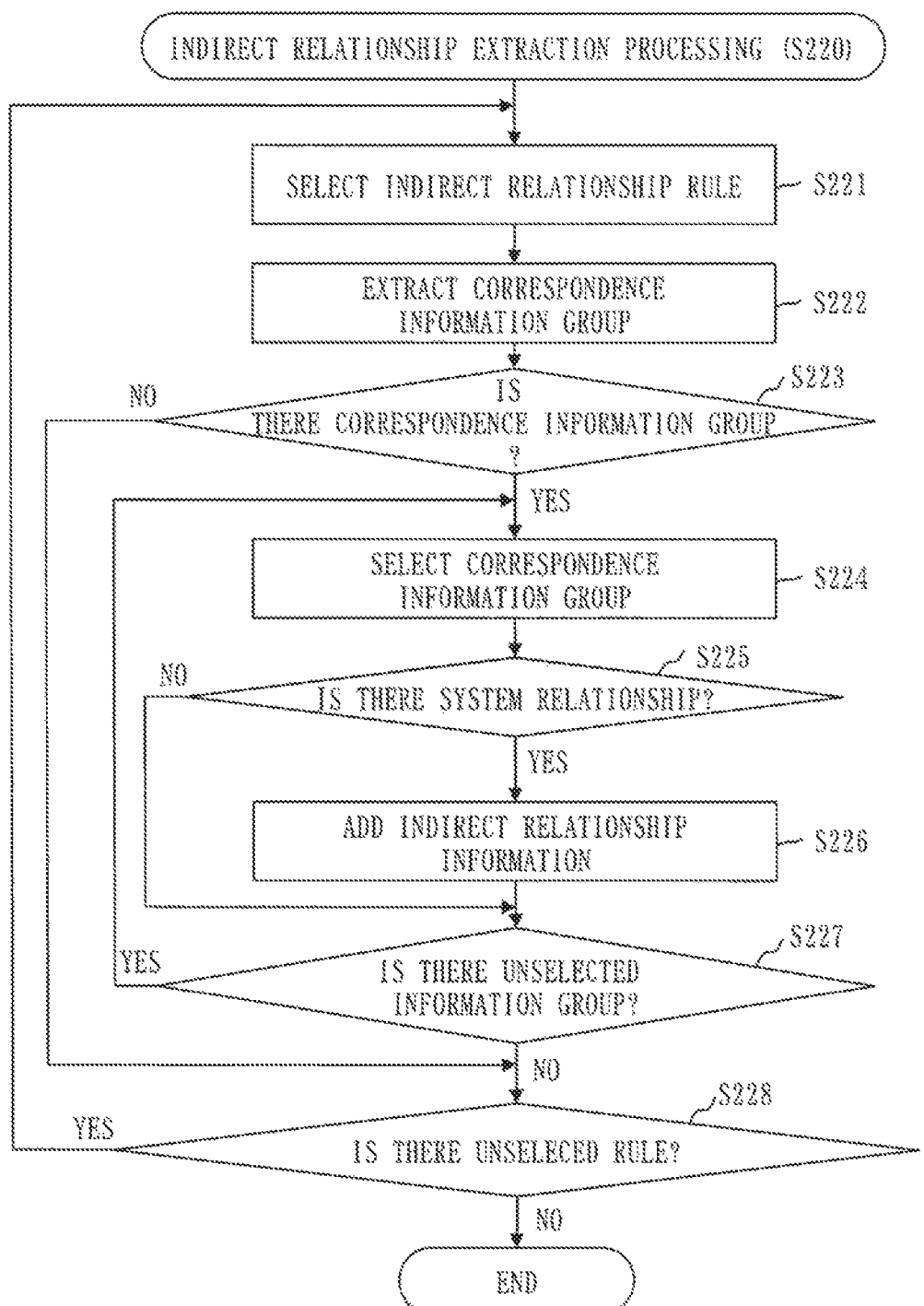
FIG. 15 is a flowchart of indirect relationship extraction processing (S220) in the embodiment 2.

A procedure of the indirect relationship extraction processing (S220) is described based on FIG. 15.

In step S221, the indirect relationship extraction unit 120 selects one unselected indirect relationship rule from the indirect relationship rule list 250.

Step S222 to step S227 are performed with respect to the indirect relationship rule selected in step S221.

In step S222, the indirect relationship extraction unit 120 extracts a correspondence information group from the plurality of direct relationship lists 220. The method of extracting the correspondence information group is the same as that in step S122 described in the embodiment 1.

In step S223, the indirect relationship extraction unit 120 determines whether there is a correspondence information group. If at least one correspondence information group is extracted in step S222, the indirect relationship extraction unit 120 determines that there is a correspondence information group.

If there is a correspondence information group, processing proceeds to step S224.

If there is no correspondence information group, processing proceeds to step S228.

In step S224, the indirect relationship extraction unit 120 selects one unselected correspondence information group.

Step S225 and step S226 are performed with respect to the correspondence information group selected in step S224.

In step S225, the indirect relationship extraction unit 120 determines whether a system relationship included in the indirect relationship rule holds between a plurality of systems corresponding to the system relationship included in the indirect relationship rule.

Specifically, the indirect relationship extraction unit 120 selects a plurality of systems corresponding to a system relationship included in the indirect relationship rule. Then, the indirect relationship extraction unit 120 determines whether the system relationship included in the indirect relationship rule holds between the selected plurality of systems.

If a system relationship included in the indirect relationship rule holds between a plurality of systems corresponding to the system relationship included in the indirect relationship rule, processing proceeds to step S226.

If a system relationship included in the indirect relationship rule does not hold between a plurality of systems corresponding to the system relationship included in the indirect relationship rule, processing proceeds to step S227.

In step S226, the indirect relationship extraction unit 120 generates indirect relationship information, and adds the generated indirect relationship information to the indirect relationship list 240. The method of generating the indirect relationship information is the same as that in step S126 described in the embodiment 1.

In step S227, the indirect relationship extraction unit 120 determines whether there is an unselected correspondence information group.

If there is an unselected correspondence information group, processing returns to step S224.

If there is no unselected correspondence information group, processing proceeds to step S228.

In step S228, the indirect relationship extraction unit 120 determines whether there is an unselected indirect relationship rule.

If there is an unselected indirect relationship rule, processing returns to step S221.

If there is no unselected indirect relationship rule, the indirect relationship extraction processing (S220) ends.

Advantageous Effects of Embodiment 2

An indirect dependence relationship between systems is enabled to be extracted.

Other Configurations

Generally, a system is a computer or an aggregate of computers. However, the system in the embodiment 2 can be a task, a process, or a thread. In other words, the embodiment 2 can be used to extract an indirect dependence relationship between tasks, between processes, or between threads.

Embodiment 3

Regarding an embodiment which eliminates an indirect dependence relationship between systems which do not communicate with each other from indirect dependence relationships between systems, differences from the embodiment 2 are mainly described based on FIG. 16 to FIG. 20.

Description of Configuration

Figure 16:
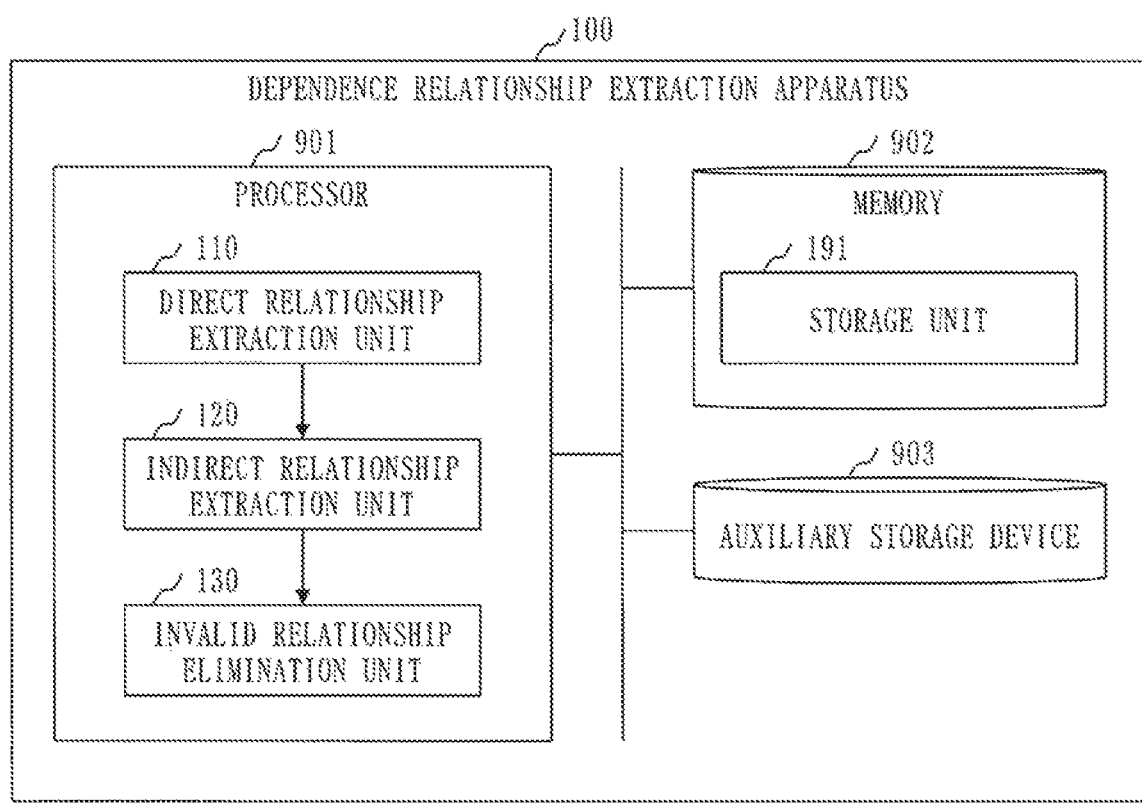
FIG. 16 is a configuration diagram of a dependence relationship extraction apparatus 100 in an embodiment 3.

A configuration of the dependence relationship extraction apparatus 100 is described based on FIG. 16.

The dependence relationship extraction apparatus 100 includes an invalid relationship elimination unit 130 as an element of the functional configuration. The function of the invalid relationship elimination unit 130 is described below.

Description of Operation

Figure 17:
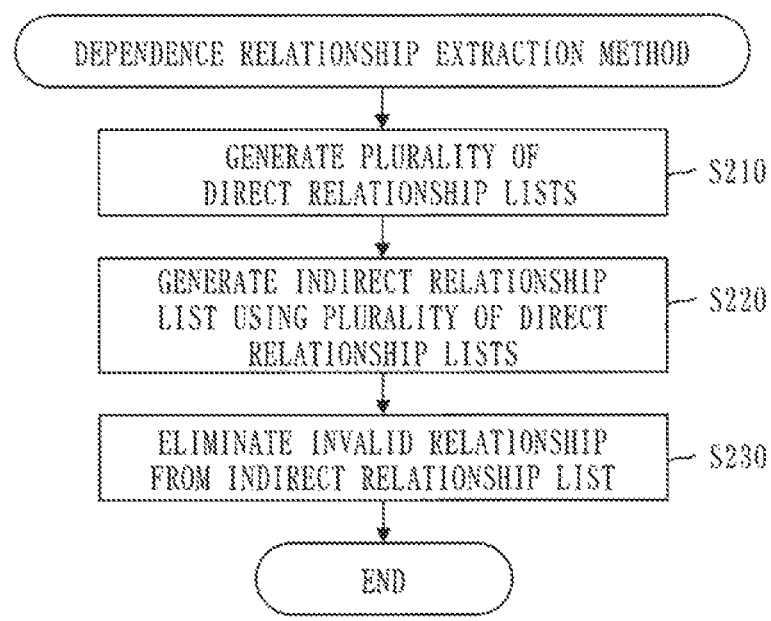
FIG. 17 is a flowchart of a dependence relationship extraction method in the embodiment 3.

A dependence relationship extraction method is described based on FIG. 17.

Step S210 and step S220 are the same as those in the embodiment 2.

Step S230 is invalid relationship extraction processing.

In step S230, the invalid relationship elimination unit 130 eliminates an invalid relationship from the indirect relationship list 240 with use of event data 260.

The event data 260 is data indicating a set of a first communication system and a second communication system. The event data 260 is previously stored in the storage unit 191.

The first communication system is a system that is one of two systems which communicate with each other. Specifically, the first communication system is a communication source system, which transmits data to a system serving as a communication partner.

The second communication system is a system that is the other of two systems which communicate with each other. Specifically, the second communication system is a communication destination system, which receives data from a system serving as a communication partner.

The invalid relationship is an indirect relationship of a set which does not correspond to a combination of the first communication system and the second communication system among sets between an indirect dependence source and an indirect dependence destination.

The set which does not correspond to a combination of the first communication system and the second communication system is a set different from a combination of an element extracted from direct relationship information corresponding to the first communication system and an element extracted from direct relationship information corresponding to the second communication system. Specifically, the element extracted from direct relationship information corresponding to the first communication system is an indirect dependence destination, and the element extracted from direct relationship information corresponding to the second communication system is an indirect dependence source.

Specifically, with respect to each piece of indirect relationship information included in the indirect relationship list 240, the invalid relationship elimination unit 130 determines whether a set between an indirect dependence source and an indirect dependence destination included in the indirect relationship information corresponds to a combination of the first communication system and the second communication system included in the event data 260. Then, the invalid relationship elimination unit 130 eliminates, from the indirect relationship list 240, indirect relationship information including a set of an indirect dependence source and an indirect dependence destination which does not correspond to any combination of the first communication system and the second communication system.

Figure 18:
FIG. 18 is a diagram illustrating event data 260 in the embodiment 3.

FIG. 18 illustrates specific event data 260.

The event data 260 includes two pieces of event information.

Each piece of event information includes a first communication system and a second communication system.

Event information of "No. 1" indicates a send from a system 1 to a system 2.

Event information of "No. 2" indicates a send from the system 2 to a system 3.

The event data 260 can be generated based on dynamic data.

The dynamic data is data obtained by causing a system to operate. Specifically, the dynamic data is communication data which is communicated between systems.

FIG. 19 illustrates an indirect relationship list 240 which is generated with use of the indirect relationship list 240 in FIG. 14 and the event data 260 in FIG. 18.

In FIG. 14, a combination of systems corresponding to a set of an indirect dependence source and an indirect dependence destination included in the first piece of indirect relationship information is a combination of the system 2 and the system 1. The combination of the system 2 and the system 1 is the same as a combination indicated by the event information of "No. 1" in FIG. 18. Accordingly, the first piece of indirect relationship information is not eliminated.

In FIG. 14, a combination of systems corresponding to a set of an indirect dependence source and an indirect dependence destination included in the second piece of indirect relationship information is a combination of the system 3 and the system 1. The combination of the system 3 and the system 1 is different from a combination indicated by any event information in FIG. 18. Accordingly, the second piece of indirect relationship information is eliminated.

In FIG. 14, a combination of systems corresponding to a set of an indirect dependence source and an indirect dependence destination included in the third piece of indirect relationship information is a combination of the system 3 and the system 2. The combination of the system 3 and the system 2 is the same as a combination indicated by the event information of "No. 2" in FIG. 18. Accordingly, the third piece of indirect relationship information is not eliminated.

As a result, the indirect relationship list 240 in FIG. 19 is generated.

Figure 20:
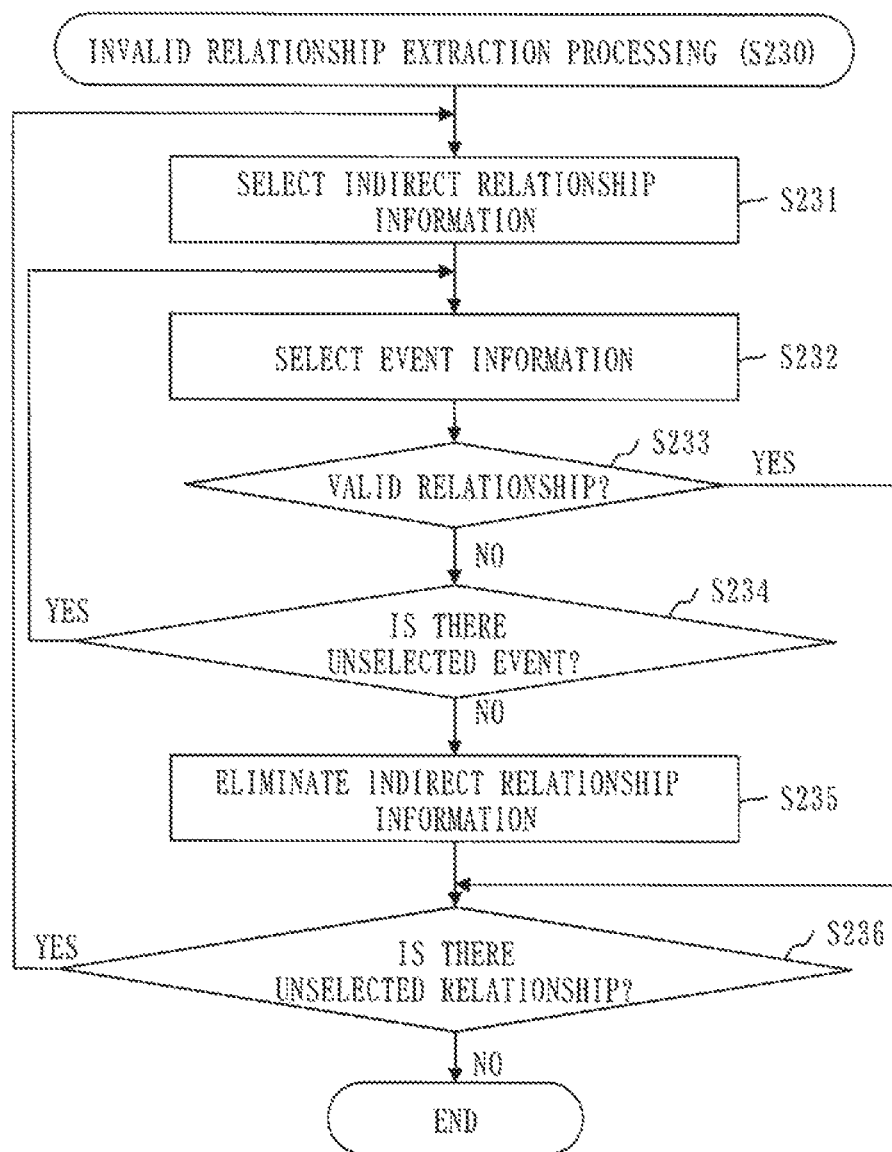
FIG. 20 is a flowchart of invalid relationship extraction processing (S230) in the embodiment 3.

A procedure of the invalid relationship extraction processing (S230) is described based on FIG. 20.

In step S231, the invalid relationship elimination unit 130 selects one piece of unselected indirect relationship information from the indirect relationship list 240.

Step S232 to step S235 are performed with respect to the indirect relationship information selected in step S231.

In step S232, the invalid relationship elimination unit 130 selects one piece of unselected event information from the event data 260.

Step S233 is performed with respect to the event information selected in step S232.

In step S233, the invalid relationship elimination unit 130 determines whether an indirect relationship indicated by the indirect relationship information is a valid relationship.

Specifically, the invalid relationship elimination unit 130 determines whether a set of the indirect dependence source and the indirect dependence destination included in the indirect relationship information is a set corresponding to a combination of the first communication system and the second communication system included in the event information. If the set of the indirect dependence source and the indirect dependence destination is a set corresponding to a combination of the first communication system and the second communication system, an indirect relationship indicated by the indirect relationship information is a valid relationship.

If the indirect relationship indicated by the indirect relationship information is a valid relationship, processing proceeds to step S236.

If the indirect relationship indicated by the indirect relationship information is not a valid relationship, processing proceeds to step S234.

In step S234, the invalid relationship elimination unit 130 determines whether there is unselected event information.

If there is unselected event information, processing returns to step S232.

If there is no unselected event information, processing proceeds to step S235.

In step S235, the invalid relationship elimination unit 130 eliminates the indirect relationship information from the indirect relationship list 240.

In step S236, the invalid relationship elimination unit 130 determines whether there is unselected indirect relationship information.

If there is unselected indirect relationship information, processing returns to step S231.

If there is no unselected indirect relationship information, the invalid relationship extraction processing (S230) ends.

Advantageous Effects of Embodiment 3

An indirect dependence relationship between systems which do not communicate with each other is enabled to be eliminated from indirect dependence relationships between systems.

In other words, an indirect dependence relationship between systems which communicate with each other is enabled to be extracted.

Supplements to Embodiments

In an embodiment, the function of the dependence relationship extraction apparatus 100 can be implemented by hardware.

Figure 21:
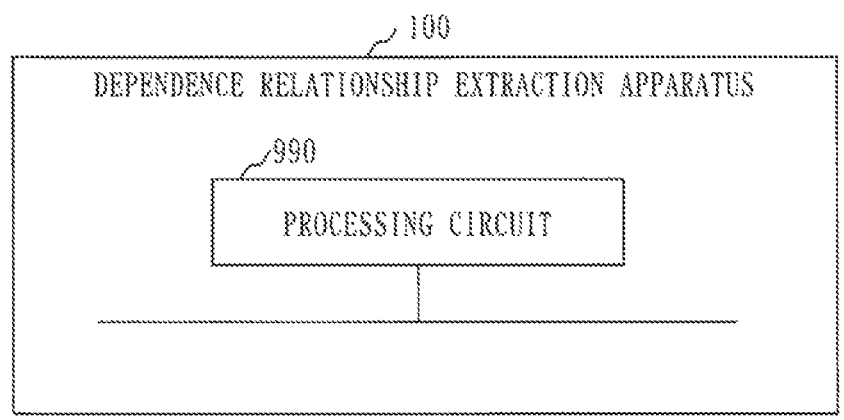
FIG. 21 is a hardware configuration diagram of a dependence relationship extraction apparatus 100 in the embodiments.

FIG. 21 illustrates a configuration in a case where the function of the dependence relationship extraction apparatus 100 is implemented by hardware.

The dependence relationship extraction apparatus 100 includes a processing circuit 990. The processing circuit 990 is also referred to as a "processing circuitry".

The processing circuit 990 is a dedicated electronic circuit which implements the functions of "units" described in the embodiments. The storage unit 191 is also included in these "units".

Specifically, the processing circuit 990 is a single circuit, a composite circuit, a programmed processor, a parallel programmed processor, a logic IC, a GA, an ASIC, an FPGA, or a combination of these. GA is an abbreviation for gate array, ASIC is an abbreviation for application specific integrated circuit, and FPGA is an abbreviation for field-programmable gate array.

The dependence relationship extraction apparatus 100 can include a plurality of processing circuits which serves as a substitute for the processing circuit 990. The plurality of processing circuits share the functions of the "units".

The functions of the dependence relationship extraction apparatus 100 can be implemented by a combination of software and hardware. In other words, a part of the functions of the "units" can be implemented by software and the remaining part of the functions of the "units" can be implemented by hardware.

The embodiments are examples of desirable configurations, and are not intended to limit the technical scope of the present invention. Each embodiment can be carried out in part, or can be carried out in combination with another embodiment. The procedure described with use of, for example, flowcharts can be altered as appropriate.

REFERENCE SIGNS LIST

100: dependence relationship extraction apparatus, 110: direct relationship extraction unit, 120: indirect relationship extraction unit, 130: invalid relationship elimination unit, 191: storage unit, 210: source code, 220: direct relationship list, 230: indirect relationship rule list, 240: indirect relationship list, 250: indirect relationship rule list, 260: event data, 901: processor, 902: memory, 903: auxiliary storage device, 990: processing circuit.

The invention claimed is:

1. A dependence relationship extraction apparatus comprising:

processing circuitry to store a direct relationship list including a set of a direct dependence source which is, among elements included in software, an element that uses another element included in the software, a direct dependence destination which is, among the elements included in the software, an element that is used by the direct dependence source, and a direct dependence type indicating a method in which the direct dependence source uses the direct dependence destination, and to, with use of an indirect relationship rule serving as a rule with respect to an indirect dependence source which is, among the elements included in the software, an element that is affected by another element included in the software and an indirect dependence destination which is, among the elements included in the software, an element that affects the indirect dependence source, and the direct relationship list, extract a set of the indirect dependence source and the indirect dependence destination, wherein the direct relationship list includes a first relationship between a first element as a direct dependence source and a second element as a direct dependence destination, and a second relationship between a third element as a direct dependence source and the second element as a direct dependence destination, and extracting the set of indirect dependence source and the indirect dependence destination includes identifying a third relationship between the first element as the indirect dependence source and the third element as the indirect dependence destination.

2. The dependence relationship extraction apparatus according to claim 1, wherein the direct relationship list includes direct relationship information indicating a set of a direct dependence source, a direct dependence destination, and a direct dependence type, wherein the indirect relationship rule includes a plurality of direct dependence types, an element relationship holding between a plurality of elements, a dependence source element serving as an indirect dependence source, and a dependence destination element serving as an indirect dependence destination, and wherein the processing circuitry extracts, from the direct relationship list, a plurality of pieces of direct relationship information corresponding to a plurality of direct dependence types and an element relationship included in the indirect relationship rule, extracts, as the indirect dependence source, an element corresponding to a dependence source element included in the indirect relationship rule from among a plurality of direct dependence sources and a plurality of direct dependence destinations included in the extracted plurality of pieces of direct relationship information, and extracts, as the indirect dependence destination, an element corresponding to a dependence destination element included in the indirect relationship rule from among a plurality of direct dependence sources and a plurality of direct dependence destinations included in the extracted plurality of pieces of direct relationship information.

3. The dependence relationship extraction apparatus according to claim 2, wherein the plurality of pieces of direct relationship information is composed of a number of pieces of direct relationship information that is the same as the number of direct dependence types included in the plurality of direct dependence types, and includes a plurality of direct dependence sources, a plurality of direct dependence destinations, and the plurality of direct dependence types, and the element relationship holds between a plurality of elements corresponding to the element relationship among the plurality of direct dependence sources and the plurality of direct dependence destinations.

4. The dependence relationship extraction apparatus according to claim 3, wherein the plurality of direct dependence types includes a first direct dependence type and a second direct dependence type, wherein the element relationship is a relationship between a direct dependence destination corresponding to the first direct dependence type and a direct dependence destination corresponding to the second direct dependence type, wherein the dependence source element is a direct dependence source corresponding to the second direct dependence type, and wherein the dependence destination element is a direct dependence source corresponding to the first direct dependence type.

5. The dependence relationship extraction apparatus according to claim 4, wherein the first direct dependence type is a write to a first variable serving as a direct dependence destination from a first function serving as a direct dependence source, wherein the second direct dependence type is a reference to a second variable serving as a direct dependence destination from a second function serving as a direct dependence source, wherein the element relationship is a coincidence between the first variable and the second variable, wherein the dependence source element is the second function, and wherein the dependence destination element is the first function.

6. The dependence relationship extraction apparatus according to claim 1, wherein the processing circuitry stores, as the direct relationship list, a plurality of direct relationship lists corresponding to a plurality of systems which communicates with each other, wherein each of the plurality of direct relationship lists includes direct relationship information indicating a set of a direct dependence source, a direct dependence destination, and a direct dependence type, and wherein the processing circuitry stores an indirect relationship rule including a plurality of direct dependence types, a system relationship holding between systems, a dependence source element serving as an indirect dependence source, and a dependence destination element serving as an indirect dependence destination, and extracts, from the plurality of direct relationship lists, a plurality of pieces of direct relationship information corresponding to a plurality of direct dependence types and a system relationship included in the indirect relationship rule, extracts, as the indirect dependence source, an element corresponding to a dependence source element included in the indirect relationship rule from among a plurality of direct dependence sources and a plurality of direct dependence destinations included in the extracted plurality of pieces of direct relationship information, and extracts, as the indirect dependence destination, an element corresponding to a dependence destination element included in the indirect relationship rule from among a plurality of direct dependence sources and a plurality of direct dependence destinations included in the extracted plurality of pieces of direct relationship information.

7. The dependence relationship extraction apparatus according to claim 6, wherein the plurality of direct dependence types includes a first direct dependence type and a second direct dependence type, wherein the first direct dependence type is a call to a send function serving as a direct dependence destination from a first function serving as a direct dependence source, wherein the second direct dependence type is a call to a receive function serving as a direct dependence destination from a second function serving as a direct dependence source, wherein the system relationship is a non-coincidence between a system corresponding to direct relationship information including the first direct dependence type and a system corresponding to direct relationship information including the second direct dependence type, wherein the dependence source element is the second function, and wherein the dependence destination element is the first function.

8. The dependence relationship extraction apparatus according to claim 6, wherein the processing circuitry stores event data indicating a first communication system which is a system that is one of two systems which communicate with each other and a second communication system which is a system that is the other of two systems which communicate with each other, and eliminates a set which does not correspond to a combination of the first communication system and the second communication system from sets between extracted indirect dependence sources and extracted indirect dependence destinations with use of the event data.

9. A non-transitory computer readable medium storing a dependence relationship extraction program using a direct relationship list and an indirect relationship rule, wherein the direct relationship list is a list including a set of a direct dependence source which is, among elements included in software, an element that uses another element included in the software, a direct dependence destination which is, among the elements included in the software, an element that is used by the direct dependence source, and a direct dependence type indicating a method in which the direct dependence source uses the direct dependence destination, wherein the indirect relationship rule is a rule between an indirect dependence source which is, among the elements included in the software, an element that is affected by another element included in the software and an indirect dependence destination which is, among the elements included in the software, an element that affects the indirect dependence source, wherein the dependence relationship extraction program causes a computer to function as an indirect relationship extraction unit to extract a set of the indirect dependence source and the indirect dependence destination with use of the direct relationship list and the indirect relationship rule, wherein the direct relationship list includes a first relationship between a first element as a direct dependence source and a second element as a direct dependence destination, and a second relationship between a third element as a direct dependence source and the second element as a direct dependence destination, and extracting the set of indirect dependence source and the indirect dependence destination includes identifying a third relationship between the first element as the indirect dependence source and the third element as the indirect dependence destination.

10. A dependence relationship extraction apparatus comprising:

processing circuitry to store a direct relationship list including a set of a direct dependence source which is, among elements included in software, an element that uses another element included in the software, a direct dependence destination which is, among the elements included in the software, an element that is used by the direct dependence source, and a direct dependence type indicating a method in which the direct dependence source uses the direct dependence destination, and to, with use of an indirect relationship rule serving as a rule with respect to an indirect dependence source which is, among the elements included in the software, an element that is affected by another element included in the software and an indirect dependence destination which is, among the elements included in the software, an element that affects the indirect dependence source, and the direct relationship list, extract a set of the indirect dependence source and the indirect dependence destination, wherein the direct relationship list includes direct relationship information indicating a set of a direct dependence source, a direct dependence destination, and a direct dependence type, the indirect relationship rule includes a plurality of direct dependence types, an element relationship holding between a plurality of elements, a dependence source element serving as an indirect dependence source, and a dependence destination element serving as an indirect dependence destination, a first direct dependence type of the plurality of direct dependence types is a write to a first variable serving as a direct dependence destination from a first function serving as a direct dependence source, a second direct dependence type of the plurality of direct dependence types is a reference to a second variable serving as a direct dependence destination from a second function serving as a direct dependence source, the element relationship is a coincidence between the first variable and the second variable, the dependence source element is the second function, and the dependence destination element is the first function.

11. A dependence relationship extraction apparatus comprising:

processing circuitry to store a direct relationship list including a set of a direct dependence source which is, among elements included in software, an element that uses another element included in the software, a direct dependence destination which is, among the elements included in the software, an element that is used by the direct dependence source, and a direct dependence type indicating a method in which the direct dependence source uses the direct dependence destination, and to, with use of an indirect relationship rule serving as a rule with respect to an indirect dependence source which is, among the elements included in the software, an element that is affected by another element included in the software and an indirect dependence destination which is, among the elements included in the software, an element that affects the indirect dependence source, and the direct relationship list, extract a set of the indirect dependence source and the indirect dependence destination, wherein the processing circuitry stores an indirect relationship rule including a plurality of direct dependence types, a system relationship holding between systems, a dependence source element serving as an indirect dependence source, and a dependence destination element serving as an indirect dependence destination, the plurality of direct dependence types includes a first direct dependence type and a second direct dependence type, the first direct dependence type is a call to a send function serving as a direct dependence destination from a first function serving as a direct dependence source, the second direct dependence type is a call to a receive function serving as a direct dependence destination from a second function serving as a direct dependence source, the system relationship is a non-coincidence between a system corresponding to direct relationship information including the first direct dependence type and a system corresponding to direct relationship information including the second direct dependence type, the dependence source element is the second function, and the dependence destination element is the first function.

* * * * *